United States Patent
Yamasaki et al.

(10) Patent No.: US 12,542,728 B2
(45) Date of Patent: Feb. 3, 2026

(54) SDN SYSTEM, SDN SUB-CONTROLLER, AND METHOD OF CONTROLLING SDN SYSTEM

(71) Applicant: TOYOTA JIDOSHA KABUSHIKI KAISHA, Toyota (JP)

(72) Inventors: Yasuhiro Yamasaki, Nisshin (JP); Hideki Goto, Okazaki (JP); Ikuyoshi Otake, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 261 days.

(21) Appl. No.: 18/489,165

(22) Filed: Oct. 18, 2023

(65) Prior Publication Data

US 2024/0147289 A1    May 2, 2024

(30) Foreign Application Priority Data

Nov. 1, 2022  (JP) ................... 2022-175587

(51) Int. Cl.
  *H04L 43/10*   (2022.01)
  *G06F 8/65*    (2018.01)
  *H04W 28/02*   (2009.01)

(52) U.S. Cl.
  CPC ............... *H04L 43/10* (2013.01); *G06F 8/65* (2013.01); *H04W 28/021* (2013.01)

(58) Field of Classification Search
  CPC ........ H04W 28/021; G06F 8/65; H04L 43/10; H04L 12/28; H04L 41/40; H04L 67/12; H04L 41/0663; B60R 16/023
  See application file for complete search history.

(56) References Cited

U.S. PATENT DOCUMENTS

| | | | |
|---|---|---|---|
| 9,813,286 B2* | 11/2017 | Fang | .................. H04L 41/0663 |
| 11,894,978 B1* | 2/2024 | Liu | ..................... H04L 41/0893 |
| 2020/0007629 A1* | 1/2020 | Tse | ........................ H04L 43/20 |

(Continued)

FOREIGN PATENT DOCUMENTS

| CN | 111865659 A  * | 10/2020 | ............. H04L 43/10 |
|---|---|---|---|
| JP | 2017-169044 A  | 9/2017 | |

(Continued)

OTHER PUBLICATIONS

Beheshti et al., "Fast Failover for Control Traffic in Software defined Networks", 2012 IEEE Global Communications Conference (GlobeCom), Dec. 3-7, 2012, pp. 2665-2670. (Year: 2012).*

(Continued)

*Primary Examiner* — Oanh Duong
(74) *Attorney, Agent, or Firm* — Oblon, McClelland, Maier & Neustadt, L.L.P.

(57) ABSTRACT

A method of controlling an SDN system, an SDN sub-controller, and an SDN system is provided. The SDN controller sends a keepalive notification to the SDN switch and the SDN sub-controller. The SDN switch sends a switching request to the SDN sub-controller on condition that the keepalive notification cannot be received during a predetermined specific period. The SDN sub-controller starts to control a communication setting of the SDN switch on condition that the keepalive notification cannot be received during the specific period and that the switching request has been received.

9 Claims, 4 Drawing Sheets

(56) References Cited

U.S. PATENT DOCUMENTS

2020/0067809 A1* 2/2020 K .................. H04L 41/0681
2023/0269177 A1* 8/2023 Mullis .................. H04L 45/42
                                                                709/238

FOREIGN PATENT DOCUMENTS

JP         2022156831 A   * 10/2022
KR          102592206 B1  * 10/2023   ............. H04L 69/08

OTHER PUBLICATIONS

Kuzniar et al., "Automatic Failure Recovery for Software-Defined Networks", HotSDN '13 Proceedings of the second ACM SIGCOMM workshop on Hot topics in software defined networking, COMM ACM SIGCOMM, Aug. 16, 2013, pp. 159-160. (Year: 2013).*

* cited by examiner

SDN SYSTEM, SDN SUB-CONTROLLER, AND METHOD OF CONTROLLING SDN SYSTEM

BACKGROUND

1. Field

The present disclosure relates to an SDN system, an SDN sub-controller, and a method of controlling an SDN system.

2. Description of Related Art

Japanese Laid-Open Patent Publication No. 2017-169044 discloses a software-defined network (SDN) system capable of changing the communication setting of a network. An SDN system includes multiple SDN switches and an SDN controller that changes the setting of each SDN switch.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an SDN system for vehicles is provided. Each vehicle includes one or more control circuits. The one or more control circuits include the SDN system. The SDN system includes an SDN switch, an SDN controller configured to control a communication setting of the SDN switch, and an SDN sub-controller capable of controlling the communication setting.

The SDN controller is configured to perform a keepalive notification process that sends a keepalive notification to the SDN switch and the SDN sub-controller. The keepalive notification indicates that the SDN controller itself is functioning properly. The SDN switch is configured to execute a switching request process that sends a switching request to the SDN sub-controller on condition that the keepalive notification cannot be received during a predetermined specific period. The switching request indicates a request for switching a controlling agent that controls the communication setting. The SDN sub-controller is configured to execute a switching process on condition that: the keepalive notification cannot be received during the specific period; and the switching request has been received. The switching process starts to control the communication setting by the SDN sub-controller.

In another general aspect, an SDN sub-controller is provided. One or more control circuits each include an SDN controller, the SDN sub-controller, and an SDN switch. The SDN controller is configured to control a communication setting of the SDN switch. The SDN sub-controller is capable of controlling the communication setting in place of the SDN controller. The SDN sub-controller is configured to execute a switching process on condition that: a keepalive notification cannot be received from the SDN controller; and a switching request has been received from the SDN switch. The keepalive notification indicates that the SDN controller is functioning properly. The switching request indicates a request for switching a controlling agent that controls the communication setting. The switching process starts to control the communication setting by the SDN sub-controller.

With the above-described configuration, the SDN sub-controller recognizes that the SDN controller is in an anomalous state through communication with the SDN switch and communication with the SDN controller. It is therefore possible to determine that the SDN controller is in an anomalous state with high reliability. Even if the SDN controller is in an anomalous state, the SDN sub-controller is capable of controlling the communication setting of the SDN switch.

In the SDN system described in the above publication, communication through the SDN system may be impossible when the SDN controller is in an anomalous state. Therefore, there is a need for a technique that determines an anomalous state of an SDN controller with high reliability. The above-described configuration provides such a technique.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An SDN system, an SDN sub-controller, and a method of controlling an SDN system according to an embodiment of the present disclosure will now be described. A communication system 10 including multiple vehicles 20 and a server 30 will now be described with reference to FIGS. 1 to 5. At least one of the vehicles 20 includes an SDN system.

Outline of Communication System

Figure 1:
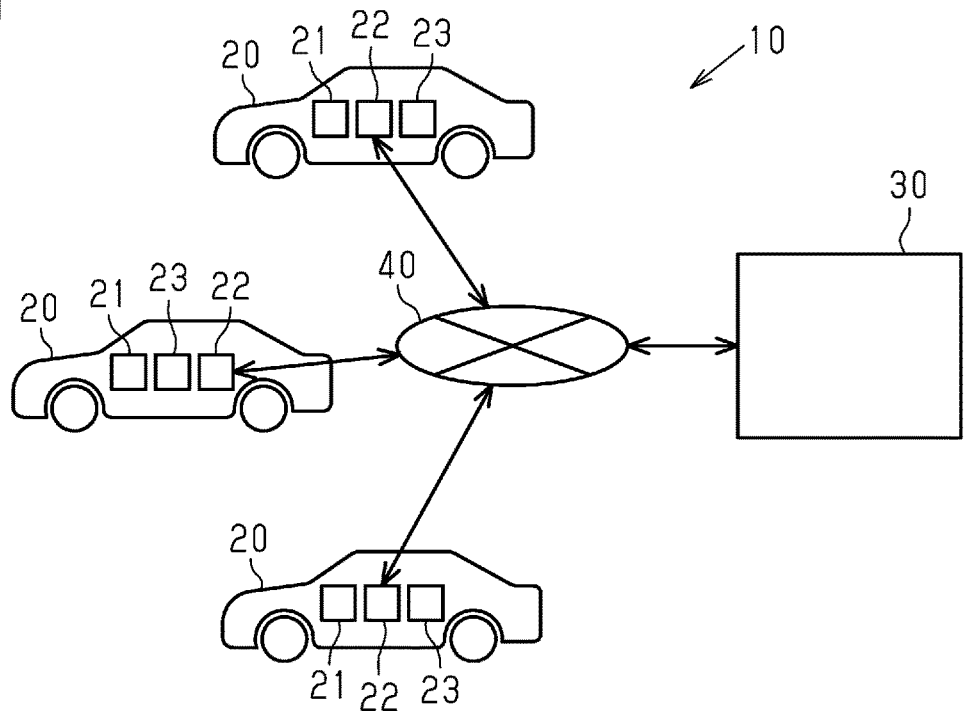
FIG. 1 is a schematic diagram showing a communication system including multiple vehicles.

As shown in FIG. 1, the communication system 10 includes the vehicles 20 and the server 30. Each vehicle 20 includes a vehicle controlling device 21, a communication device 22, and an operation terminal 23. The vehicle controlling device 21 includes one or more control circuits that control devices on the vehicle 20. The vehicle controlling device 21 will be described in detail later.

The communication device 22 is connected to the server 30 via an external communication network 40. The external communication network 40 is, for example, a wireless communication network such as a mobile telephone communication network. This allows the vehicle 20 and the server 30 to exchange information with each other through the external communication network 40.

The operation terminal 23 is operated by the user of the vehicle 20. The operation terminal 23 is, for example, a touch display. The operation terminal 23 displays images indicating information input from the vehicle controlling device 21. The operation terminal 23 also inputs information related to operation by the user to the vehicle controlling device 21.

Although not illustrated, the server 30 includes a CPU and a ROM. The CPU of the server 30 executes programs stored in the ROM. Accordingly, the server 30 transmits campaign information and distribution packages to the vehicles 20.

Outline of Vehicle Controlling Device

Figure 2:
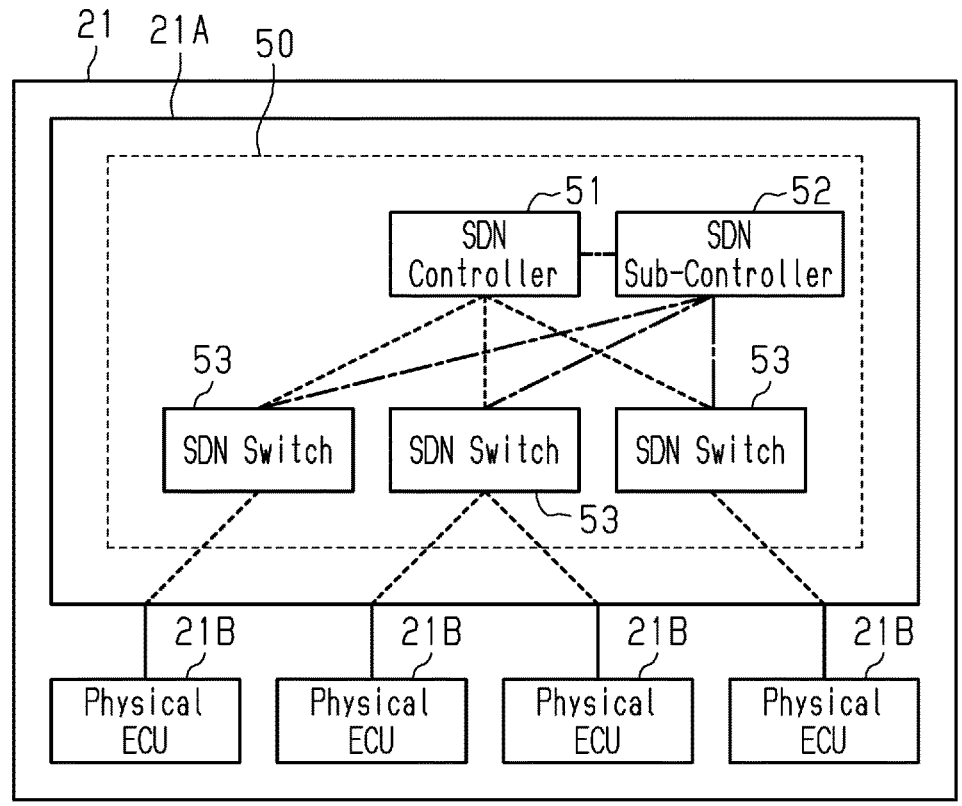
FIG. 2 is a schematic diagram showing a vehicle controlling device mounted on the vehicle shown in FIG. 1.

As shown in FIG. 2, the vehicle controlling device 21 includes a master ECU 21A and multiple physical ECUs 21B. The master ECU 21A and the physical ECUs 21B are connected together by communication lines. Although not illustrated, the master ECU 21A and the physical ECUs 21B each include a CPU and a ROM. The ECU executes programs stored in the ROM. The physical ECUs 21B control hardware devices connected to the respectively physical ECUs 21B. The hardware devices include, for example, an engine, brakes, and motors.

The master ECU 21A includes an SDN system 50. The SDN system 50 includes an SDN controller 51, an SDN sub-controller 52, and multiple SDN switches 53.

The SDN controller 51 controls a communication setting of each of the SDN switches 53. Specifically, the SDN controller 51 defines data communication paths on the network of the SDN system 50. The SDN controller 51 determines a data communication path, for example, when a new physical ECU 21B is connected. That is, the SDN controller 51 dynamically controls the communication setting. The SDN controller 51 also sends path information or the like indicating data communication paths to each SDN switch 53. Thus, the SDN controller 51 centrally manages the communication setting of each SDN switch 53. The SDN controller 51 also sends data to be transferred by the SDN switches 53.

Like the SDN controller 51, the SDN sub-controller 52 is capable of controlling the communication setting of each SDN switch 53. The SDN sub-controller 52 is capable of controlling data communication paths on the network of the SDN system 50, in place of the SDN controller 51. The SDN sub-controller 52 may be a device of the same type as the SDN controller 51 or a device that has other functions in addition to the functions of controlling communication setting.

The SDN switches 53 perform data transfer on the network of the SDN system 50. Specifically, the SDN switches 53 each update rules for data transfer stored in its flow table based on the path information received from the SDN controller 51. The SDN switches 53 transfer data received from the SDN controller 51 to a suitable physical ECU 21B based on the updated rules.

Further, the SDN controller 51 is capable of executing a download process that downloads a software update from the server 30, which is located outside the vehicle 20. The SDN controller 51 installs and activates the software update that has been downloaded in the download process. In accordance with these procedures, the SDN controller 51 is capable of executing the updated software.

Series of Processes Related to OTA Update

The server 30 transmits campaign information to the communication device 22 of each vehicle 20. When the communication device 22 of the vehicle 20 receives the campaign information, the communication device 22 outputs the campaign information to the vehicle controlling device 21. When receiving the campaign information, the vehicle controlling device 21 executes an over-the-air (OTA) update program. The campaign information is information indicating an event in which software update is performed on the vehicles 20 on the market.

Figure 3:
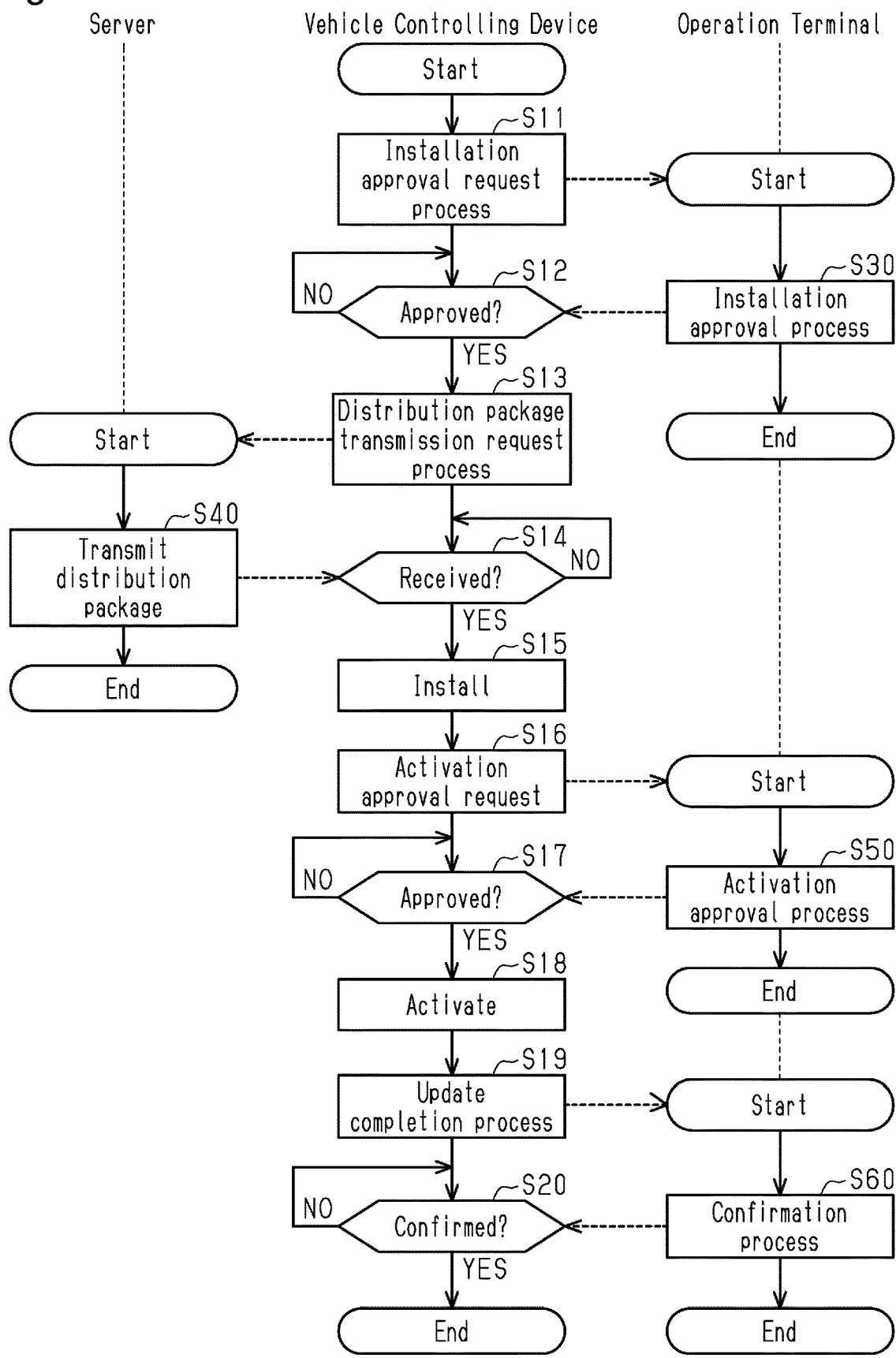
FIG. 3 is a flowchart showing a series of processes in an over-the-air (OTA) update program executed by the vehicle controlling device shown in FIG. 2.

As shown in FIG. 3, when starting the series of processes of the OTA update program, the vehicle controlling device 21 first performs the process of step S11. In step S11, the vehicle controlling device 21 requests the user of the vehicle 20 to approve installation of software update. More specifically, the vehicle controlling device 21 outputs an installation approval message to the operation terminal 23, asking the user whether it is acceptable to install the software update. The installation approval message is, for example, a message that says, "Would you like to apply the new software?" Subsequently, the vehicle controlling device 21 advances the process to step S12.

When an operation indicating approval of installation of the software update is performed by the user after the installation approval message is input from the vehicle controlling device 21, the operation terminal 23 executes an installation approval process program. When the installation approval process program is started, the operation terminal 23 executes step S30. In step S30, the operation terminal 23 executes an installation approval process. In the installation approval process, the operation terminal 23 outputs information indicating the user's approval to install the software update to the vehicle controlling device 21. The operation terminal 23 then terminates the installation approval process program.

In step S12, the vehicle controlling device 21 determines whether the installation of the software update has been approved by the user. The vehicle controlling device 21 determines whether the user has approved the installation of the software update based on whether information indicating the user's approval for the installation of the software update has been entered from the operation terminal 23. When receiving no information indicating the user's approval from the operation terminal 23 (S12: NO), the vehicle controlling device 21 repeats the process of step S12. When receiving information indicating the user's approval from the operation terminal 23 (S12: YES), the vehicle controlling device 21 advances the process to step S13.

In step S13, the vehicle controlling device 21 executes a distribution package transmission request process. In the distribution package transmission request process, the vehicle controlling device 21 transmits information indicating a request for a distribution package to the server 30 via the communication device 22. Subsequently, the vehicle controlling device 21 advances the process to step S14.

When receiving the information indicating a request for the distribution package from the communication device 22, the server 30 executes a distribution package transmission program. When starting the distribution package transmission program, the server 30 executes step S40. In step S40, the vehicle controlling device 21 transmits a distribution package to the communication device 22. The server 30 then terminates the distribution package transmission program.

In step S14, the vehicle controlling device 21 determines whether the communication device 22 has download the distribution package. When the communication device 22 has not downloaded the distribution package (S14: NO), the vehicle controlling device 21 repeats the process of step S14. When the communication device 22 has downloaded the distribution package (S14: YES), the vehicle controlling device 21 advances the process to step S15.

In step S15, the vehicle controlling device 21 installs the distribution package that has been downloaded by the communication device 22. The distribution package is a series of data sets transferred from the server 30 to the vehicle 20 at a time. The distribution package includes display information of a human machine interface (HMI), package information, security information, and the like, in addition to the main part of the software update. Further, the distribution package includes network information of the SDN system 50. That is, the distribution package includes a communication setting of each SDN controller 51. When the vehicle controlling device 21 downloads the distribution package, the SDN controller 51 downloads the communication settings of the respective SDN switches 53 in the distribution package. When the vehicle controlling device 21 installs the software update in the distribution package, the SDN controller 51 installs the communication settings of the respective SDN switches 53 in the distribution package. Subsequently, the vehicle controlling device 21 advances the process to step S16.

In step S16, the vehicle controlling device 21 requests the user of the vehicle 20 to approve activation of the installed software update. Specifically, the vehicle controlling device 21 outputs an activation approval message to the operation terminal 23. The activation approval message shows a query asking for approval of activation of the software update. The activation approval message is, for example, a message such as, "Update will take approximately XX minutes. During that time, you won't be able to restart. Is that okay?" Subsequently, the vehicle controlling device 21 advances the process to step S17.

When the user performs an operation indicating approval of activation of the software update after the activation approval message is input from the vehicle controlling device 21, the operation terminal 23 executes an activation approval process program. When the activation approval process program is started, the operation terminal 23 executes step S50. In step S50, the operation terminal 23 executes an activation approval process. In the activation approval process, the operation terminal 23 outputs information indicating the approval by the user to the vehicle controlling device 21. The operation terminal 23 then terminates the activation approval process program.

In step S17, the vehicle controlling device 21 determines whether the user has approved activation of the software update. Depending on whether the information indicating the approval by the user has been input from the operation terminal 23, the vehicle controlling device 21 determines whether the user has approved activation of the software update. When receiving no information indicating the approval by the user from the operation terminal 23 (S17: NO), the vehicle controlling device 21 repeats step S17. When receiving information indicating the approval by the user from the operation terminal 23 (S17: YES), the vehicle controlling device 21 advances the process to step S18.

In step S18, the vehicle controlling device 21 activates the installed software update. This allows the vehicle controlling device 21 to control the vehicle 20 based on the information of the activated software update. When the vehicle controlling device 21 activates the software update, the SDN controller 51 activates a new communication setting of each SDN switch 53. Subsequently, the vehicle controlling device 21 advances the process to step S19.

In step S19, the vehicle controlling device 21 executes an update completion process. In the update completion process, the vehicle controlling device 21 outputs, to the operation terminal 23, information indicating that the update of the software based on the current campaign information has been completed. Specifically, the vehicle controlling device 21 outputs, to the operation terminal 23, an update completion message indicating that the software update has been completed. The update completion message is, for example, a message such as, "Update to new software completed." Subsequently, the vehicle controlling device 21 advances the process to step S20.

When the user performs an operation indicating confirmation of completion of the software update after the update completion message is input from the vehicle controlling device 21, the operation terminal 23 executes a confirmation process program. When the confirmation process program is started, the operation terminal 23 performs step S60. In step S60, the operation terminal 23 executes a confirmation process. In the confirmation process, the operation terminal 23 outputs information indicating that the user has confirmed completion of the software update to the vehicle controlling device 21. The operation terminal 23 then terminates the confirmation process program.

In step S20, the vehicle controlling device 21 determines whether the user has confirmed completion of the software update. The vehicle controlling device 21 determines whether the user has confirmed the completion of the software update depending on whether information indicating that the user has confirmed completion of the software update has been input from the operation terminal 23. When not receiving information indicating that the user has confirmed completion of the software update from the operation terminal 23 (S20: NO), the vehicle controlling device 21 repeats step S20. When receiving information indicating that the user has confirmed that completion of software update from the operation terminal 23 (S20: YES), the vehicle controlling device 21 terminates the series of processes.

Switching of Controlling Agent

As described above, when the vehicle controlling device 21 activates the software update based on the campaign information, the SDN controller 51 updates the communication setting of each SDN switch 53. When the SDN controller 51 updates the communication setting of each SDN switch 53, the vehicle controlling device 21 executes an SDN controller switching program stored in the ROM.

Figure 4:
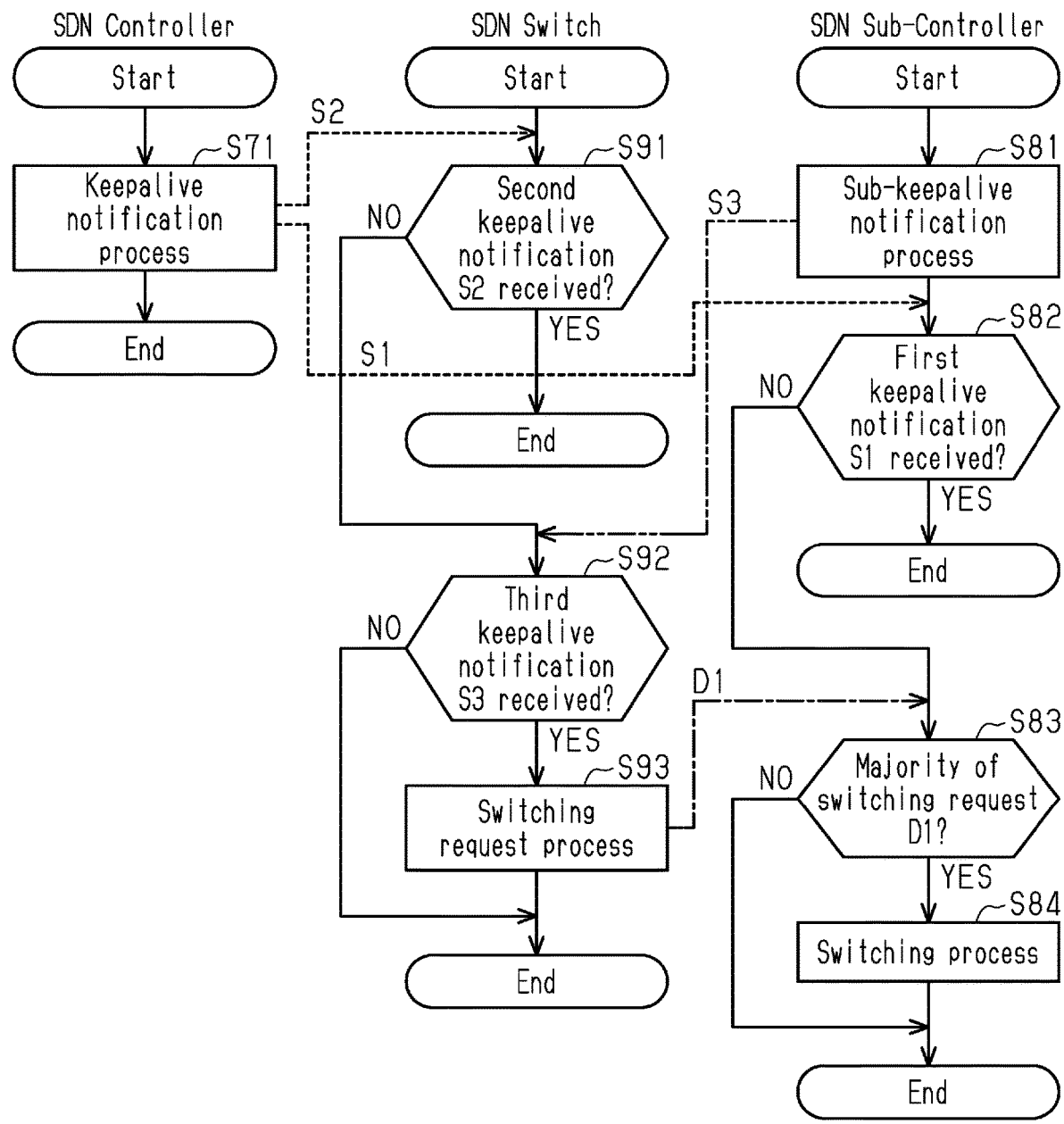
FIG. 4 is a flowchart showing a series of processes for switching a controlling agent executed by the SDN sub-controller according to the present disclosure shown in FIG. 2.

As shown in FIG. 4, when the vehicle controlling device 21 starts the SDN controller switching program, the SDN controller 51 executes step S71. In step S71, the SDN controller 51 executes a keepalive notification process. In the keepalive notification process, the SDN controller 51 sends, to the SDN switches 53 and the SDN sub-controller 52, keepalive notifications indicating that the SDN controller 51 itself is functioning properly.

Figure 5:
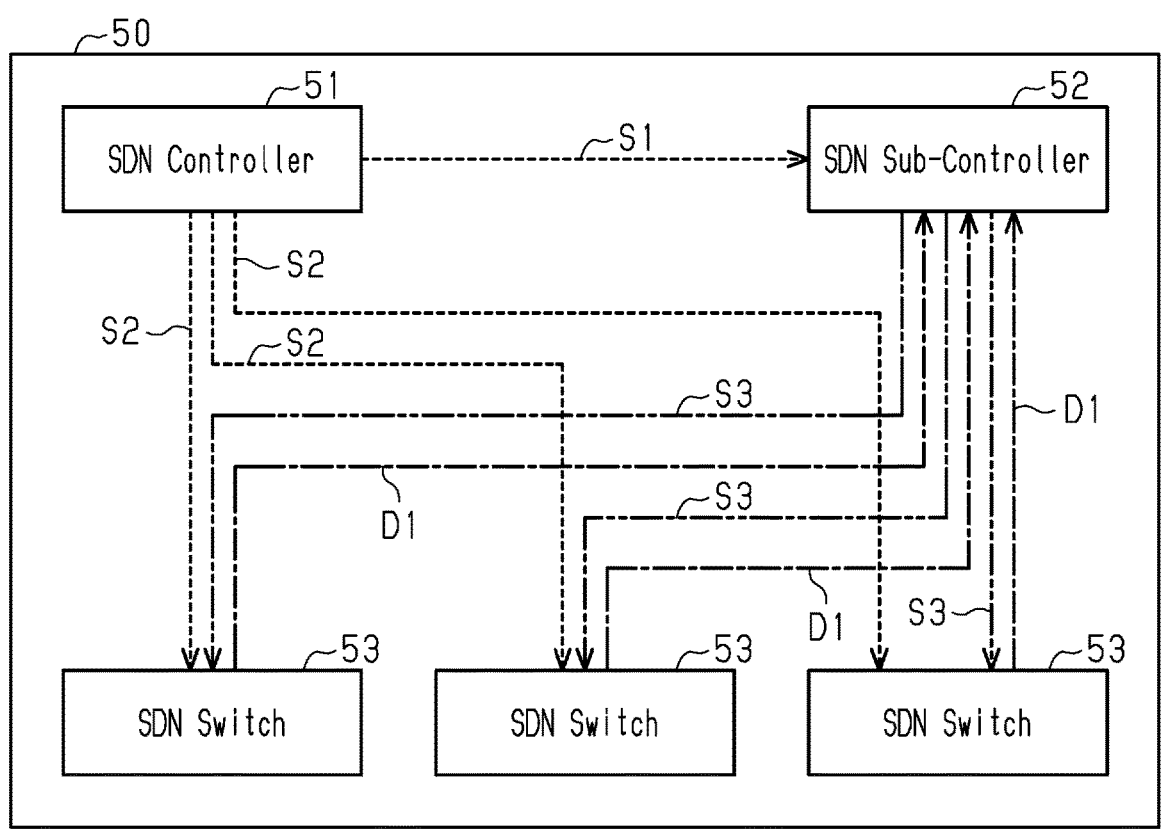
FIG. 5 is a diagram illustrates flows of signals to switch the controlling agent in the flowchart of FIG. 4.

As shown in FIG. 5, when these keepalive notifications are distinguished from each other based on the destinations, the keepalive notification sent to the SDN sub-controller 52 is referred to as a first keepalive notification S1, and the keepalive notification sent to the SDN switches 53 is referred to as a second keepalive notification S2.

After sending the first keepalive notification S1 to the SDN sub-controller 52 and the second keepalive notification S2 to the SDN switches 53, the SDN controller 51 terminates the keepalive notification process. At this time, the SDN controller 51 sends the second keepalive notification S2 to all the SDN switches 53 in the SDN system 50.

As described above, when the vehicle controlling device 21 activates the software update based on the campaign information, the vehicle controlling device 21 executes an SDN sub-controller switching program stored in the ROM.

As shown in FIG. 4, when the vehicle controlling device 21 starts the SDN sub-controller switching program, the SDN sub-controller 52 first executes step S81. In step S81, the SDN sub-controller 52 executes a sub-keepalive notification process. In the sub-keepalive notification process, the SDN sub-controller 52 sends to the SDN switches 53 a keepalive notification indicating that the SDN sub-controller 52 itself is functioning properly. Subsequently, the SDN sub-controller 52 advances the process to step S82.

As shown in FIG. 5, when distinguished from the first keepalive notification S1 and the second keepalive notification S2 in the above-described keepalive notification process, the keepalive notification sent to the SDN switches 53 from the SDN sub-controller 52 is referred to as a third keepalive notification S3.

In step S82, the SDN sub-controller 52 determines whether the first keepalive notification S1 has been received. Specifically, the SDN sub-controller 52 stands by only for a predetermined first specific period starting from the moment the vehicle controlling device 21 activates the software update based on the campaign information, to receive the first keepalive notification S1. In other words, the SDN sub-controller 52 stands by only for the first specific period from the moment the SDN controller 51 executes the keepalive notification process, to receive the first keepalive notification S1. When receiving the first keepalive notification S1 during the first specific period (S82: YES), the SDN sub-controller 52 terminates the current series of processes. When the first keepalive notification S1 cannot not be received during the first specific period (S82: NO), the SDN sub-controller 52 advances the process to step S83.

When the vehicle controlling device 21 activates the software update based on the campaign information, the vehicle controlling device 21 executes an SDN switch switching program stored in the ROM.

When the vehicle controlling device 21 starts the SDN switch switching program, each SDN switch 53 first executes step S91. The following processes are executed concurrently on all the SDN switches 53. In step S91, each SDN switch 53 determines whether the second keepalive notification S2 has been received. Specifically, the SDN switch 53 stands by only for the first specific period starting from the moment the vehicle controlling device 21 activates the software update based on the campaign information, to receive the second keepalive notification S2. In other words, the SDN switch 53 stands by only for the first specific period from the moment the SDN controller 51 executes the keepalive notification process, to receive the second keepalive notification S2. When receiving the second keepalive notification S2 during the first specific period (S91: YES), the SDN switch 53 terminates the current series of processes. When the second keepalive notification S2 cannot be received during the first specific period (S91: NO), the SDN switch 53 advances the process to step S92.

In step S92, the SDN switch 53 determines whether the third keepalive notification S3 has been received. Specifically, the SDN switch 53 stands by only for the second specific period starting from the moment the vehicle controlling device 21 activates the software update based on the campaign information, to receive the third keepalive notification S3. The second specific period is, for example, the same as the first specific period. If the third keepalive notification S3 is not received during the second specific period (S92: NO), the SDN switch 53 terminates the current series of processes. If the third keepalive notification S3 is received during the second specific period (S92: YES), the SDN switch 53 advances the process to step S93.

In step S93, the SDN switch 53 executes a switching request process. In the switching request process, the SDN switch 53 sends a switching request D1 to the SDN sub-controller 52. The switching request D1 indicates a request for switching the controlling agent that controls the communication setting of the SDN switch 53. The SDN switch 53 then terminates the current series of processes.

On the other hand, after the process of step S82, the SDN sub-controller 52 executes step S83. In step S83, the SDN sub-controller 52 determines whether a majority of the switching requests D1 have been received. Specifically, the SDN sub-controller 52 stands by only for a predetermined third specific period after the process of step S82, to receive the switching request D1. The SDN sub-controller 52 calculates the number of the switching requests D1 received during the third specific period. The SDN sub-controller 52 then compares the number of the received switching requests D1 with the number of the SDN switches 53 in the SDN system 50. The SDN sub-controller 52 determines whether the number of the received switching requests D1 is more than half the number of the SDN switches 53.

In this manner, when determining that a majority of the switching requests D1 have not been received (S83: NO), the SDN sub-controller 52 terminates the current series of processes. When determining that a majority of the switching requests D1 have been received (S83: YES), the SDN sub-controller 52 advances the process to step S84.

In step S84, the SDN sub-controller 52 executes a switching process. In the switching process, the SDN sub-controller 52 starts to control the communication setting of each SDN switch 53. That is, the SDN sub-controller 52 executes the switching process on condition that, during the first specific period, the second keepalive notification S2 cannot be received and that the switching request D1 has been received. Particularly, in the present embodiment, in place of the SDN controller 51, the SDN sub-controller 52 serves as the controlling agent that controls the communication setting of all the SDN switches 53 through the switching process. When the SDN sub-controller 52 starts to control the communication setting of each SDN switches 53, the SDN switches 53 no longer accept control from the SDN controller 51. The SDN sub-controller 52 then terminates the series of processes.

Operation of Embodiment

In the above-described embodiment, the SDN controller 51 controls the communication setting of each SDN switch 53 in the SDN system 50. However, when the software update is activated over the air (OTA), changes in settings and the like can result in an anomalous state, in which the SDN controller 51 cannot function properly. At such times, within the SDN system 50, when certain conditions are met, the controlling agent is switched to the SDN sub-controller 52.

Advantages of Embodiment (1) In the above-described embodiment, the SDN sub-controller 52 executes the switching process on condition that, during the first specific period, the second keepalive notification S2 cannot be received and that the switching request D1 has been received. Therefore, the SDN sub-controller 52 recognizes that the SDN controller 51 is no longer functioning properly, based on communication with both the SDN switches 53 and the SDN controller 51. Therefore, it can be determined with high reliability that the SDN controller 51 is no longer functioning properly. Even if the SDN controller 51 is in an anomalous state, the SDN sub-controller 52 can control the SDN system 50.

(2) In the above-described embodiment, the SDN sub-controller 52 executes the switching process on condition that the second keepalive notification S2 cannot be received and that the switching requests D1 have been received from a majority of the SDN switches 53. When the switching requests D1 have been sent from a majority of the SDN switches 53 as described above, it is unlikely that an anomaly has occurred in a specific SDN switch 53 and the switching request D1 was erroneously sent from the specific SDN switch 53. That is, if the switching requests D1 have been sent from a majority of the SDN switches 53, it is highly likely that an anomaly has occurred in the SDN controller 51. The above-described switching process prevents the controlling agent that controls the SDN switches 53 from being unnecessarily switched to the SDN sub-controller 52.

(3) In the above-described embodiment, when activating the software update over the air (OTA), the SDN controller 51 executes the keepalive notification process. Thus, in the SDN system 50, the series of processes related to switching of the controlling agent begins shortly after the communication setting has been updated. Consequently, it is possible to prevent an extended delay in switching the controlling agent when the SDN controller 51 enters into an anomalous state due to the updating of communication setting.

(4) In the above-described embodiment, each SDN switch 53 executes the switching request process on condition that the third keepalive notification S3 has been received. That is, each SDN switch 53 sends the switching request D1 when the SDN sub-controller 52 is functioning properly. Thus, the controlling agent that controls the SDN switches 53 is prevented from being switched to the SDN sub-controller 52 in an anomalous state.

OTHER EMBODIMENTS

The above-described embodiment may be modified as follows. The above-described embodiment and the following modifications can be combined as long as the combined modifications remain technically consistent with each other.
Switching of Controlling Agent In the above-described embodiment, the SDN sub-controller 52 executes the switching process on condition that the switching requests D1 have been received from a majority of the SDN switches 53. However, the present disclosure is not limited to this. For example, the SDN sub-controller 52 may execute the switching process on condition that the switching requests D1 have been received from at least a predetermined specific number of the SDN switches 53. In this case, the specific number is not limited to half the number of the SDN switches 53. Specifically, when the number of the SDN switches 53 is ten, the specific number may be two.

For example, in the keepalive notification process, the SDN controller 51 may send, in addition to the second keepalive notification S2, a control switch count, which is the number of the SDN switches 53 being controlled by the SDN controller 51, to the SDN sub-controller 52. In this case, the SDN sub-controller 52 may execute a switching process when the following three conditions are met. The first condition is that the second keepalive notification S2 cannot be received during the first specific period. The second condition is that the switching request D1 has been received from at least one of the SDN switches 53. The third condition is that the control switch count is less than a predetermined specific number. The specific number is less than the total number of the SDN switches 53. The specific number is, for example, half the number of the SDN switches 53. In this case, the SDN sub-controller 52 executes the switching process on condition that the number of the SDN switches 53 that are being controlled by the SDN controller 51 is less than the specific number. That is, the SDN sub-controller 52 starts control when the SDN controller 51 can control only less than half the SDN switches 53. It is thus possible to determine with high reliability an anomalous state in which the SDN controller 51 can control only part of the SDN switches 53. In such an anomalous state, the controlling agent is switched to the SDN sub-controller 52.

For example, in the keepalive notification process, the SDN controller 51 sends, to the SDN sub-controller 52, information indicating IDs that identify the SDN switches 53 that are being controlled by the SDN controller 51. In this case, the SDN sub-controller 52 may execute a switching process when the following three conditions are met. The first condition is that the SDN sub-controller 52 cannot receive the second keepalive notification S2 during the first specific period. The second condition is that the SDN sub-controller 52 has received the switching request D1. The third condition is that the IDs of the SDN switches 53 having sent the switching requests D1 received by the SDN sub-controller 52 are not included in the information indicating the IDs received by the SDN sub-controller 52. In other words, the third condition is that the information indicating the IDs received by the SDN sub-controller 52 does not include the IDs of the SDN switches 53 that have sent the switching requests D1 received by the SDN sub-controller 52. According to these conditions, the SDN sub-controller 52 executes the switching process when the SDN switches 53 send the switching requests D1 and the SDN controller 51 is not controlling the SDN switches 53. That is, the SDN sub-controller 52 executes the switching process in response to the switching requests D1 from the SDN switches 53 that are not being controllable by the SDN controller 51. Thus, the SDN sub-controller 52 executes the switching process when the SDN controller 51 recognize that the SDN controller 51 cannot control the SDN switches 53 and the SDN switches 53 recognize that the SDN switches 53 are not controlled. Thus, it is highly reliably determined that the SDN controller 51 is not functioning properly.

Further, as in the above-described modifications, a signal different from the keepalive signal may be sent in the keepalive notification process. In such a case, the SDN sub-controller 52 may identify the control switch count or the IDs based on the signals received in the previous keepalive notification process. When the SDN controller 51 is in an anomalous state, such a signal different from the keepalive signal cannot be sent to the SDN sub-controller 52 in some cases, in addition to the fact that the first keepalive notification S1 cannot be sent to the sub-controller 52. Even in such a case, the switching process can be executed if the conditions of the above-described modifications are met.

Alternatively, the switching process may be executed, for example, on condition that the second keepalive notification S2 cannot be received and that at least one switching request D1 has been received. That is, the number of the received switching requests D1 and the ID of the SDN controller 51 that has sent the switching requests D1 do not have to be used as the execution conditions of the switching process.

In the above-described embodiment, the SDN switch 53 executes the switching request process on condition that the third keepalive notification S3 has been received. However, the switching request process may be executed regardless of the third keepalive notification S3. In this case, the SDN sub-controller 52 does not need to execute the sub-keepalive notification process.

In the above-described embodiment, when the SDN sub-controller 52 executes the switching process, the controlling agent that controls all the SDN switches 53 is the SDN sub-controller 52. However, the present disclosure is not limited to this. For example, only the controlling agent that controls the SDN switch 53 that has sent the switching request D1 may be switched to the SDN sub-controller 52. Alternatively, for example, the SDN sub-controller 52 may exchange a switching request D1 with each of the SDN switches 53. That is, the SDN switch 53 may associate information indicating an ID unique to the SDN switch 53 itself with the switching request D1, and performs the switching request process. In this case, when receiving the switching request D1, the SDN sub-controller 52 may execute the switching process only on the SDN switch 53 that has the ID associated with the switching request D1.

Alternatively, for example, when receiving the switching request D1, the SDN switch 53 may permit the controlling agent to be switched to the SDN sub-controller 52 on condition that the second keepalive notification S2 has not been received.

Time to Start Series of Processes for Switching Controlling Agent

The time at which the SDN controller 51 starts to execute the SDN controller switching program is not limited to the time at which the software is updated over the air (OTA). For example, the SDN controller 51 may execute the keepalive notification process when the power source of the vehicle 20 is turned on. When the power source of the vehicle 20 is off, a hardware device may be newly connected or changed. Therefore, by executing the SDN controller switching program when the power source of the vehicle 20 is turned on, it is possible to change the controlling agent that controls the SDN switches 53 before the vehicle 20 starts traveling.

Alternatively, for example, the SDN controller 51 may execute the keepalive notification process when receiving a signal for switching electronic control units mounted on the vehicle 20 to an operational state. The electronic control units are, for example, the physical ECUs 21B. The physical ECUs 21B are set to be non-operational when the vehicle 20 is shipped. However, after the vehicle 20 leaves the warehouse, the physical ECUs 21B may be switched to an operational state, for example, by a car dealer, upon payment of additional fees or the like. In such a case, the communication setting may be changed by newly activating the physical ECUs 21B. Thus, when receiving from a car dealer or the like a signal that switches the physical ECUs 21B to an operational state, the SDN controller 51 executes the SDN controller switching program. Thus, when a new physical ECU 21B is woken up, the controlling agent that controls the SDN switches 53 may be changed. A signal that switches an electronic control unit to an operational state may be referred to as, for example, a wake-up signal.

For example, when detecting that a new hardware device is connected to the vehicle controlling device 21, the SDN controller 51 may execute the keepalive notification process.

Also, for example, the SDN controller 51 may perform the keepalive notification process at a predetermined frequency. Periodic execution of the keepalive notification process allows for periodic detection as to whether the SDN controller 51 is functioning properly. The frequency is set to be, for example, once per hour.

Other Modifications

The vehicle 20 is not limited to one that forms the communication system 10 if, as in the above-described modifications, the vehicle controlling device 21 executes the switching programs regardless whether the software of the vehicle 20 is updated over the air (OTA).

The vehicle controlling device 21 may include circuitry including one or more processors that perform various processes according to computer programs (software). The vehicle controlling device 21 may be circuitry including one or more dedicated hardware circuits such as application specific integrated circuits (ASIC) that execute at least part of various processes, or a combination thereof. The processor includes a CPU and a memory such as a RAM and a ROM. The memory stores program code or instructions configured to cause the CPU to execute processes. The memory, which is a computer-readable medium, includes any type of media that are accessible by general-purpose computers and dedicated computers. The media include a non-transitory computer readable medium that stores a program for causing a controlling device to execute a control process. The control process includes, for example, a control process of an SDN system.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A software-defined network (SDN) system for vehicles, each vehicle including one or more control circuits, the one or more control circuits including the SDN system, the SDN system comprising:
   a SDN switch;
   a SDN controller configured to control a communication setting of the SDN switch; and
   a SDN sub-controller capable of controlling the communication setting, wherein the SDN controller is configured to perform a keepalive notification process that sends a keepalive notification to the SDN switch and the SDN sub-controller, the keepalive notification indicating that the SDN controller itself is functioning properly, the SDN switch is configured to execute a switching request process that sends a switching request to the SDN sub-controller on condition that the keepalive notification cannot be received during a predetermined specific period, the switching request indicating a request for switching a controlling agent that controls the communication setting, the SDN sub-controller is configured to execute a switching process on condition that:

the keepalive notification cannot be received during the specific period; and the switching request has been received, and the switching process starts to control the communication setting by the SDN sub-controller.

2. The SDN system according to claim 1, wherein the SDN switch is one of multiple SDN switches, the SDN controller is configured to, in the keepalive notification process, send information indicating a control switch count to the SDN sub-controller in addition to the keepalive notification, the control switch count is the number of the SDN switches that are being controlled by the SDN controller, and the SDN sub-controller is configured to execute the switching process on condition that:

the keepalive notification cannot be received during the specific period;

the switching request has been received from at least one of the SDN switches; and the control switch count is less than a predetermined specific number, the specific number being less than a total number of the SDN switches.

3. The SDN system according to claim 1, wherein the SDN switch is one of multiple SDN switches, the SDN controller sends, in the keepalive notification process, information indicating an ID identifying the SDN switch that is being controlled by the SDN controller to the SDN sub-controller in addition to the keepalive notification, and the SDN sub-controller is configured to execute the switching process on condition that:

the keepalive notification cannot be received during the specific period;

the switching request has been received; and the received information indicating the ID does not include the ID of the SDN switch that has sent the received switching request.

4. The SDN system according to claim 1, wherein the SDN switch is one of multiple SDN switches, the SDN sub-controller is configured to execute the switching process on condition that:

the keepalive notification cannot be received during the specific period; and the switching requests have been received from a majority of the SDN switches.

5. The SDN system according to claim 1, wherein the SDN controller is configured to execute the keepalive notification process when a power source of the vehicle is turned on.

6. The SDN system according to claim 1, wherein the SDN controller is configured to execute the keepalive notification process when receiving a signal for switching an electronic control unit mounted on the vehicle to an operational state.

7. The SDN system according to claim 1, wherein the SDN controller is capable of executing a download process, the download process downloads a software update from a server, the server is located outside the vehicle, the SDN controller is configured to execute the keepalive notification process when activating the software update that has been downloaded in the download process.

8. The SDN system according to claim 1, wherein the SDN controller is configured to periodically execute the keepalive notification process at a predetermined frequency.

9. A software-defined network (SDN) sub-controller in a SDN system, wherein the SDN system includes:

a SDN controller, the SDN sub-controller, and a SDN switch, the SDN controller is configured to control a communication setting of the SDN switch, the SDN sub-controller comprising a processor circuitry configured to control the communication setting in place of the SDN controller, the processing circuitry is configured to execute a switching process on condition that:

a keepalive notification cannot be received from the SDN controller; and a switching request has been received from the SDN switch, the keepalive notification indicates that the SDN controller is functioning properly, the switching request indicates a request for switching a controlling agent that controls the communication setting, and the switching process starts to control the communication setting by the SDN sub-controller.

* * * * *